United States Patent [19]

Yoshida et al.

[11] 4,098,931

[45] Jul. 4, 1978

[54] PROCESS FOR COATING CELLULOSIC PLASTIC ARTICLES

[75] Inventors: Motoaki Yoshida, Takarazuka; Nobuhiro Sakata, Nishinomiya, both of Japan

[73] Assignee: Nippon Sheet Glass Co., Ltd., Osaka, Japan

[21] Appl. No.: 780,187

[22] Filed: Mar. 22, 1977

[30] Foreign Application Priority Data

Mar. 31, 1976 [JP] Japan .................................. 51/36546

[51] Int. Cl.² ............................................. B44D 1/092
[52] U.S. Cl. .................. 427/324; 427/390 R
[58] Field of Search ........................... 427/324, 390 R

[56] References Cited

FOREIGN PATENT DOCUMENTS

| 813,919 | 5/1959 | United Kingdom ................. 427/324 |
| 640,985 | 8/1950 | United Kingdom ................. 427/324 |
| 584,219 | 1/1947 | United Kingdom ................. 427/324 |

*Primary Examiner*—Michael R. Lusignan
*Attorney, Agent, or Firm*—Wenderoth, Lind & Ponack

[57] ABSTRACT

A cellulosic plastic article, such as an article of cellulose propionate, cellulose acetate butyrate or cellulose butyrate, is coated with good adhesion of an applied coat by pretreating the surface of the article with an aqueous solution containing an alkali metal and an alcohol, then applying a coating composition comprising a thermosetting resin to the treated surface, and curing the coating.

6 Claims, No Drawings

PROCESS FOR COATING CELLULOSIC PLASTIC ARTICLES

BACKGROUND OF THE INVENTION

This invention relates to a process for coating the surface of a cellulosic plastic article, and more specifically, to a pretreatment which is performed in this process in order to increase the adhesion of an applied coat.

Generally, the presence of functional groups having high polarity on the surface of a plastic article permits good adhesion of an applied coating. Cellulose inherently possesses many hydroxyl groups which are the highly polar functional groups. In fabrication, however, most of these hydroxyl groups are esterified with, for example, acetic acid, propionic acid or butyric acid to ester groups having lower polarity in order to impart moldability to cellulose. For this reason, the amount of highly polar functional groups present in the surface of a cellulosic plastic molded article is usually small, and without pretreatment, good adhesion is difficult to secure in the coating of such a molded article of cellulosic plastics.

DESCRIPTION OF THE PRIOR ART

It has been the frequent practice in the coating of a cellulosic plastic article to dip it in an alkali solution so as to saponify its surface and form functional groups (hydroxyl groups) required for increasing the adhesion of an applied coating to the surface of the substrate. For example, in the coating of a cellulose acetate article with a melamine-type resin, good adhesion can be obtained by dipping it in a 3% aqueous solution of sodium hydroxide for 5 minutes when it has a low degree of acetylation, and in a 7% aqueous solution of sodium hydroxide for about 5 minutes when it has a high degree of acetylation. With an article of cellulose esterified with propionic acid or butyric acid, however, good adhesion cannot be obtained even when it is pretreated for long periods of time with a 20% aqueous solution of sodium hydroxide. This is presumably because the alkali solution has an insufficient saponifying power for cellulose propionate and cellulose butyrate.

SUMMARY OF THE INVENTION

It is an object of this invention therefore to pretreat those cellulosic plastic articles which have heretofore been difficult to coat with good adhesion, such as articles of cellulose propionate, cellulose acetate butyrate or cellulose butyrate, with aqueous solutions having a sufficient saponifying power for such cellulose esters.

According to the present invention, there is provided a process for coating a cellulosic plastic article such as an article of cellulose propionate, cellulose acetate butyrate or cellulose butyrate, which comprises contacting an aqueous solution containing an alkali metal and an alcohol with the surface of the cellulosic plastic article, then coating a thermosetting resin on the treated surface, and curing the coating.

DESCRIPTION OF THE PREFERRED EMBODIMENT

The pretreating aqueous solution is obtained by mixing or dissolving an alkali metal hydroxide such as sodium hydroxide or potassium hydroxide and an alcohol such as methanol, ethanol, n-propanol or iso-propanol with or in water; or by mixing or dissolving a metallic alkali such as metallic sodium or metallic potassium and the alcohol with or in water; or by mixing or dissolving an alkali metal alkoxide such as sodium ethoxide or potassium methoxide with or in water. If the concentrations of the alkali metal and alcohol in the aqueous solution are too low, the adhesion strength of the coated film is insufficient. On the other hand, if the concentrations are too high, the surface of the cellulosic article is attacked and roughened with the occurrence of depressed and raised portions or line scars. Suitably, the aqueous solution has an alkali metal concentration of 3 to 40% by weight calculated as hydroxide and an alcohol concentration of 3 to 40% by weight, and the product of the alkali metal concentration value in % by weight multiplied by the alcohol concentration value in % by weight is 50 to 200, preferably 80 to 170.

The surface of a cellulosic plastic article to be coated is pretreated with this aqueous solution by a dipping or spraying technique. The pretreated surface is washed with distilled water, dried, and in a customary manner, coated with a coating composition, followed by curing to form a coated film having good adhesion.

Too short a time of contact with the pretreating aqueous solution is ineffective; whereas if the contact time is too long, the surface is roughened. The proper contact time varies according to the temperature at which the contacting is performed. If the contacting temperature is too low, long periods of time are required to complete the pretreatment. If it is high, the contact time must be shortened. Preferably, the concentrations of the alkali metal and alcohol in the aqueous solution, the contact time, and the contact temperature should be controlled according to the degree of propylation, butylation or acetylation of cellulose in the substrate. Productivity will become poor if the pretreatment is carried out for long periods of time at low temperatures. On the other hand, if the temperature is too high, the water and alcohol will be evaporated. This causes a change in the concentrations of the alkali metal and alcohol in the aqueous solution, and the production is difficult to continue stably. It is desirable therefore that the pretreatment be carried out at 10° to 40° C, preferably 20° to 30° C, for 3 to 30 minutes, preferably 5 to 15 minutes.

Examples of the thermosetting resin used in this invention include melamine-type resins, melamine alkyd resins, melamine acrylic resins, epoxy-type resins, and urea-type resins.

It has not yet been made entirely clear why pretreatment of the surface of a cellulosic plastic article with a specified aqueous solution containing an alkali metal and an alcohol increases the adhesion strength of a coating applied to the pretreated surface. We theorize however that the alkali metal alkoxide formed in the pretreating aqueous solution has a strong saponifying power for cellulose propionate, cellulose acetate butyrate or cellulose butyrate in the surface of the plastic article.

The invention is more specifically illustrated by the following examples in which cellulosic plastic articles were coated by the process of this invention in order to improve their abrasion resistance.

EXAMPLE 1

A cellulose propionate plate (CELIDOR CPM, a trademark for a product of Bayer AG) having a size of 50 mm × 60 mm × 2 mm and a cellulose acetate butyrate plate (CELIDOR BSP MH, a trademark for a product of Bayer AG) of the same size were each pretreated by being dipped for 10 minutes in each of the 13 aqueous pretreating solutions indicated in Table 1 below. The treated plates were each washed with water, dried, and coated with a mixture of 80 parts by weight of a commercially available butoxymelamine resin solution (BECKAMINE L 105-60, a trademark for a product of Dainippon Ink and Chemicals, Inc.; the solvent, toluene; the solids contents, about 50% by weight), 20 parts by weight of a commercially available alkyd resin solution (BECKOSOL 234, a trademark for a product of Dainippon Ink and Chemicals, Inc.; the solvent, toluene; the solids content, about 40% by weight), and 2 parts by weight, based on the resin solids, of p-toluenesulfonic acid as a catalyst. The coating was baked at 80° C for 1 hour, and cooled to room temperature. Each of the coated samples obtained was then subjected to a crosscut tape test. Specifically, 11 parallel lines were cut on the surface of each sample lengthwise and crosswise at intervals of 1 mm by means of a knife to provide 100 squares. A Cellophase tape was attached to the crosscut surface, and then peeled off. The number of squares adhering to the substrate without peeling per 100 squares was counted, and the results are shown in Table 1. Each of the values was an average of three reproductions.

found that the adhesion of the coating was as poor as that of Sample No. 9.

EXAMPLE 2

The same cellulose propionate plate as used in Example 1 was pretreated by being dipped for 10 minutes in each of the aqueous solutions indicated in Table 2, washed with water, dried, and coated with a coating composition which had been prepared by diluting a mixture of 50 parts by weight of a commercially available methoxymelamine resin (SUMIMAL M53W, a trademark for a product of Sumitomo Chemical Co., Ltd.) and 50 parts by weight of a commercially available polyhydroxyethyl methacrylate having a molecular weight of 10,000 to 20,000 with methyl Cellosolve (ethylene glycol monomethyl ether) to an involatile content of 80%, and adding 0.1 phr (% by weight based on the resin solids) of hydrochloric acid as a catalyst. The coating was baked at 80° C for 1 hour, and cooled to room temperature. Each of the samples was then subjected to the same crosscut tape test as shown in Example 1, and the results are shown in Table 2. It is seen from Table 2 that the mixtures of alkalies and alcohols exhibited marked effects.

Table 1

| Sample No. | Composition of the pretreating aqueous solution (parts by weight) | | | Temperature of the aqueous solution (° C) | Product of the alkali alcohol concentrations | Results of crosscut tape test | |
|---|---|---|---|---|---|---|---|
| | Alkali metal hydroxide | Alcohol | Water | | | Cellulose propionate plate | Cellullose acetate butyrate plate |
| 1 | — | — | — | — | — | 0 | 0 |
| 2 | 0 | Ethanol 30 | 70 | 30 | 0 | 9 | 3 |
| 3 | Sodium hydroxide 5 | Ethanol 10 | 85 | 20 | 50 | 32 | 82 |
| 4 | Sodium hydroxide 5 | Ethanol 10 | 85 | 39 | 50 | 68 | 75 |
| 5 | Sodium hydroxide 5 | Ethanol 20 | 75 | 30 | 100 | 100 | 100 |
| 6 | Sodium hydroxide 10 | Ethanol 10 | 80 | 20 | 100 | 97 | 73 |
| 7 | Sodium hydroxide 10 | Ethanol 10 | 80 | 30 | 100 | 91 | 96 |
| 8 | Sodium hydroxide 10 | Ethanol 15 | 75 | 30 | 150 | 100 | 100 |
| 9 | Sodium hydroxide 15 | — | 85 | 30 | 0 | 6 | 0 |
| 10 | Sodium hydroxide 15 | Ethanol 10 | 75 | 20 | 150 | 77 | 63 |
| 11 | Sodium hydroxide 15 | Ethanol 10 | 75 | 30 | 150 | 100 | 100 |
| 12 | Potassium hydroxide 10 | Methanol 10 | 80 | 30 | 100 | 95 | 82 |
| 13 | Potassium hydroxide 10 | Isopropanol 15 | 75 | 30 | 150 | 93 | 89 |
| 14 | Sodium hydroxide 10 | Isopropanol 15 | 75 | 30 | 150 | 93 | 94 |

In Table 1, the composition of the aqueous solution is such that the total amount of the constituents becomes 100 parts by weight. Hence, the amounts of the alkali metal hydroxide and the alcohol tabulated represent their concentrations in % by weight in the aqueous solution. The "product of alkali/alcohol concentrations" in the table is the product of the concentration in % by weight of the alkali metal (calculated as alkali metal hydroxide) in the pretreating aqueous solution multiplied by the concentration in % by weight of the alcohol in the pretreating aqueous solution.

The results given in Table 1 demonstrate that by pretreating cellulose propionate and cellulose acetate butyrate substrates with aqueous solutions containing alkali metals and alcohols, the adhesion of the coating to the substrates is increased.

Separately, the above substrate plates were such pretreated with the aqueous solution shown in the row of Sample No. 9 in Table 1, and then further treated with 100% isopropanol at 30° C for 10 minutes. The treated plates were coated with the same coating composition as described above, and cured in the same way. It was Table 2

| Sample No. | Composition of the pretreating aqueous solution (parts by weight) | | | Temperature of the aqueous solution (° C) | Product of the alkali/ alcohol concentrations | Results of crosscut tape test |
|---|---|---|---|---|---|---|
| | Sodium hydroxide | Ethanol | Water | | | |
| 15 | — | — | — | — | — | 0 |
| 16 | 0 | 30 | 70 | 30 | 0 | 0 |
| 17 | 5 | 10 | 85 | 20 | 50 | 17 |
| 18 | 5 | 10 | 85 | 30 | 50 | 64 |
| 19 | 5 | 20 | 75 | 30 | 100 | 94 |
| 20 | 10 | 10 | 80 | 20 | 100 | 73 |
| 21 | 10 | 10 | 80 | 30 | 100 | 94 |
| 22 | 10 | 15 | 75 | 20 | 150 | 90 |
| 23 | 15 | 0 | 85 | 30 | 0 | 0 |
| 24 | 15 | 10 | 75 | 20 | 150 | 89 |

EXAMPLE 3

The same cellulose acetate butyrate plate as used in Example 1 was pretreated by being dipped for 10 minutes in each of the pretreating aqueous solutions shown in Table 3, washed with water, dried, and coated with a coating composition which had been prepared by adding isopropyl acetate, butyl acetate and toluene as solvents to 100 parts by weight of a commercially available epoxy resin (EPICLON H-210, a trademark for a bisphenol-type polyhydroxy polyether made by Dainippon Ink and Chemicals, Inc.) and 24 parts by weight of a commercially available polyurethane resin (EPICLON B-907, a trademark for a product of Dainippon Ink and Chemicals, Inc.) to a solids content of 30% and then adding 0.4 phr of dimethylaminomethyl phenol as a catalyst. The coating was baked at 80° C for 1 hour, and cooled to room temperature. Each of the samples obtained was subjected to the same crosscut tape test as set forth in Example 1, and the results are shown in Table 3. It is seen from Table 3 that the mixtures of alkalies and alcohols exhibited marked effects.

Table 3

| Sample No. | Composition of the pretreating aqueous solution (parts by weight) | | | Temperature of the aqueous solution (° C) | Product of the alkali/alcohol concentrations | Results of crosscut tape test |
|---|---|---|---|---|---|---|
| | Sodium hydroxide | Ethanol | Water | | | |
| 25 | — | — | — | — | — | 0 |
| 26 | 0 | 30 | 70 | 30 | 0 | 0 |
| 27 | 5 | 10 | 85 | 20 | 50 | 23 |
| 28 | 5 | 20 | 75 | 30 | 100 | 80 |
| 29 | 10 | 10 | 80 | 20 | 100 | 100 |

EXAMPLE 4

The same cellulose propionate and cellulose acetate butyrate plates as used in Example 1 were each pretreated by being dipped for 10 minutes in each of the pretreating aqueous solutions shown in Table 4, washed with water, dried, and coated with a coating composition which had been prepared by adding ethyl Cellosolve (ethylene glycol monoethyl ether) to 47.2 parts by weight of a commercially available hexamethoxymethyl melamine resin (SUMIMAL M-100, a trademark for a product of Sumitomo Chemical Co., Ltd.) and 32.8 parts by weight of 1,4-butanediol to a solids content of 50%, and further adding 0.5 phr (as a 10% aqueous solution) of ammonium nitrate. The coating was baked at 80° C for 1 hour, and cooled to room temperature. Each of the samples obtained was subjected to the same crosscut tape test as set forth in Example 1, and the results are shown in Table 4. It is seen from Table 4 that the mixtures of alkalies and alcohols exhibited marked effects.

Table 4

| No. | Composition of the pretreating aqueous solution (parts by weight) | | | | Temperature of the aqueous solution (° C) | Product of the alkali/alcohol concentrations | Results of crosscut tape test | |
|---|---|---|---|---|---|---|---|---|
| | Sodium hydroxide | Ethanol | n-Propanol | Water | | | Cellulose propionate plate | Cellulose acetate butyrate plate |
| 30 | — | — | — | — | — | — | 0 | 0 |
| 31 | 0 | 30 | — | 70 | 30 | 0 | 0 | 0 |
| 32 | 0 | — | 30 | 70 | 30 | 0 | 0 | 0 |
| 33 | 3 | 10 | — | 87 | 20 | 30 | 0 | 23 |
| 34 | 3 | — | 10 | 87 | 20 | 30 | 0 | 12 |
| 35 | 10 | 10 | — | 80 | 20 | 100 | 100 | 100 |
| 36 | 10 | — | 10 | 80 | 20 | 100 | 83 | 91 |

What we claim is:

1. A process for coating a cellulosic plastic article which comprises contacting the surface of a cellulosic plastic article with an aqueous solution containing an alkali metal hydroxide or alkoxide in a concentration of 3 to 40% by weight calculated as the hydroxide and an alcohol in a concentration of 3 to 40% by weight, wherein the product of the alkali metal concentration in percent by weight multiplied by the alcohol concentration in percent by weight is 50 to 200; then coating a thermosetting resin on the treated surface and finally curing the coating.

2. The process of claim 1 wherein the cellulosic plastic is cellulose propionate, cellulose acetate butyrate, or cellulose butyrate.

3. The process of claim 1 wherein the contacting of the aqueous solution with the surface of the plastic article is performed at 10° to 40° C for 3 to 30 minutes.

4. The process of claim 1 wherein the alkali metal is sodium, potassium, or both.

5. The process of claim 1 wherein the alcohol is at least one member selected from the group consisting of methanol, ethanol, n-propanol, and iso-propanol.

6. The process of claim 1 wherein the thermosetting resin is a melamine-type resin, a melamine alkyl resin, a melamine acrylic resin, an epoxy-type resin, or a urea-type resin.

* * * * *